March 29, 1955     K. N. CEDERQUIST     2,704,895
DRYING PEAT AND SIMILAR VEGETABLE MATERIALS
Filed June 21, 1950
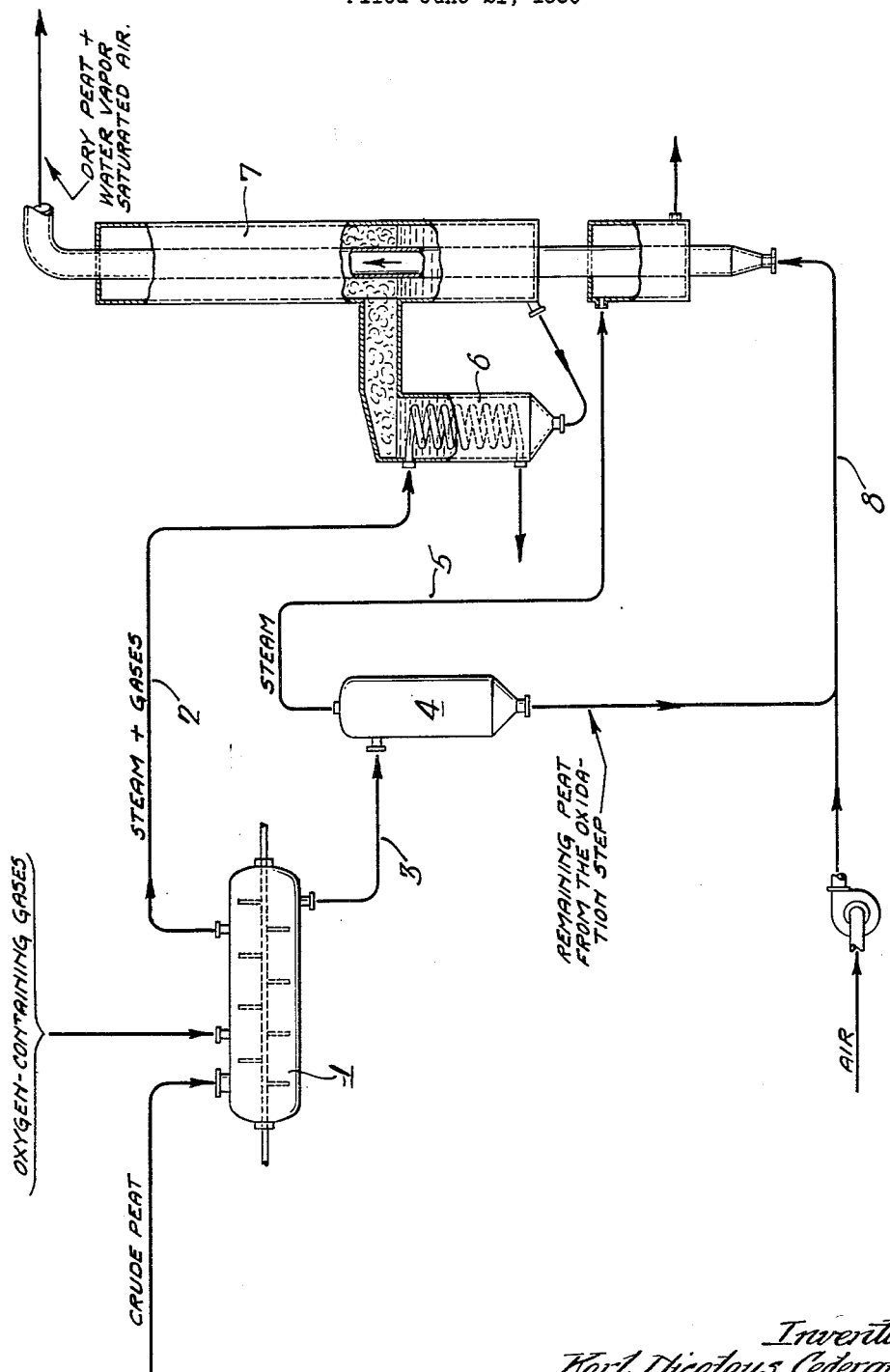
Inventor:
Karl Nicolaus Cederquist
by Howson & Howson
Attys.

United States Patent Office 2,704,895
Patented Mar. 29, 1955

2,704,895

DRYING PEAT AND SIMILAR VEGETABLE MATERIALS

Karl Nicolaus Cederquist, Falun, Sweden, assignor to Stora Kopparbergs Bergslags Aktiebolag, Falun, Sweden, a limited joint-stock company of Sweden Application June 21, 1950, Serial No. 169,523

Claims priority, application Sweden February 18, 1950

5 Claims. (Cl. 34—12)

The present invention relates to improvements in drying peat and similar vegetable materials, in the following called "materials of said kind." The term "vegetable" here means peat, peat moss (sphagnum), straw, wood, lignite etc.

The invention has for its object to provide a method to evaporate water from aqueous materials of said kind, particularly of a dryness of 25–75%, substantially for producing fuels and products for carrying out certain chemical processes such as gas producing, hydrogenation, carbonisation etc.

Vegetable materials of said kind often contain up to 60–90% water and an artificial drying cannot economically be used due to the high heat costs. Even in the best machineries using steam as heating medium for drying peat powder or similar materials the water cannot be evaporated by consuming less than 400,000 cal. per ton water. This amount of heat corresponds to 600–650 kgs. of steam of 2–3 atm. gage pressure.

As shown in his co-pending application No. 86,853 filed in the United States on April 11, 1949, now Patent Number 2,668,099, the inventor has discovered that peat and similar lignocellulosic materials easily can be partially burnt and oxidized in their natural water-containing condition at an elevated temperature to carbon dioxide and water by supplying oxygen gas or oxygen containing gases under pressure. The exothermic heat developed in this oxidation process is quite sufficient to keep the process running without supplying heat from external sources and the material treated in said manner can easily be dewatered to 40–60% dryness by mechanical means such as by filtration and/or squeezing. However, to obtain a higher dryness the water in the material is to be evaporated.

The inventor has now found that a vegetable material of said kind can be partially oxidized by introducing oxygen gas or oxygen containing gases under pressure and that the resulting residue can be further dried by using the steam and vapors generated in said pressure heating. This process is of a great economical value as a partial drying of the material is obtained when generating the steam and vapors which are used for finally drying the material.

With other words, to dry the material a certain amount of steam is required. If the steam is generated directly from the material the steam consumption will be less than if the steam wholly is supplied from an external source, such as a boiling plant. Thus peat mass in a single stage drying process consumes an amount of steam at least equal to the amount of water, but when generating the steam by pressure-heating the material in accordance with the invention the amount of steam required will be only about the half of said amount of water.

Check runs have shown that when treating a peat powder of 40% dryness, about 100–110 cubic meter oxygen gas per ton dry substance are consumed to produce a finished product of 90–100% dryness. This will in most cases involve an essentially cheaper way to obtain the necessary heat than producing it over a separate steam plant.

The single figure on the accompanying drawing is a flow diagram illustrative of the process of the present invention.

The present process will be more readily understood from a consideration of the accompanying drawing in which the numeral 1 designates a pressure vessel provided with an agitator into which vessel is fed the crude peat. Oxygen-containing gas under pressure is also admitted to pressure vessel 1, and partial oxidation of the peat takes place. The organic substance which is oxidized is substantially completely broken down to carbon dioxide and water. The steam and the non-condensable gases which are produced in vessel 1 are drawn off by pipe line 2. The desired temperature and pressure are maintained in vessel 1 by regulating the discharge of steam and non-condensable gases. The residue in vessel 1 is discharged by pipe line 3 and allowed to expand in expansion chamber 4, the steam generated by the pressure drop being drawn off by a pipe line 5. The evaporation of water in expansion chamber 4 results in further partial drying of the wet peat mass.

The steam and non-condensable gas drawn off by pipe line 2 may then be led to heat exchanger 6 in which the steam is condensed generating low-pressure steam for dryer 7.

The residue from vessel 1, after expanding in chamber 4, is blown to dryer 7 through pipe line 8 by means of air.

By the partial combustion of the peat in vessel 1, steam is generated and simultaneously a drying of the peat mass is obtained. The heat generated in 1 is transformed into low pressure steam in 6, by which the generated heat fully can be utilized for the final drying. Thus the heat evolved is used in two stages.

Preferably the material entering the oxidizing step of the novel drying process should have a dryness of at least about 25% to make the process satisfactory in economical respect. In case the crude peat or the similar material has a lower dryness it should be subjected to a dewatering process by any suitable means such as filtration or preferably by using the process described and claimed in the above-mentioned co-pending application No. 86,853.

It is very important when carrying out the oxidation step especially when the material to be treated is in a more or less solid state, that is having a dryness of about 25% or higher to keep the whole mass in vigorous stirring by mechanical means in order to avoid local superheating which might cause the formation of carbonisation products with a resulting risk of causing uncontrollable combustion processes.

The steam and non-condensable gases resulting from the oxidation step may alternatively be used for drying fresh amounts of wet material.

To obtain the most advantageous economy of the drying process, the amount of steam leaving the oxidation step should of course be controlled in such a way that its content of heat is substantially equal to the amount of heat necessary to complete the drying of the material remaining after the oxidation step.

The drying step, viz. the second step of the process, can be carried out in any suitable system where steam is used, such systems being known by anyone skilled in the art.

The combustion and oxidation can be carried out at any temperature between 150 and 300° C. and at a total steam and gas pressure within a range of 10–200 atm. gage pressure. In practice a temperature range of 160–200° C. and a pressure range of 10–30 atm. gage pressure are preferred.

The mixture of steam and gases leaving the oxidation apparatus may be used for the drying either directly or after having been transformed into saturated steam by a heat exchanger.

The following example is submitted in further illustration of the invention and is not to be taken as in any way restrictive of the scope of the invention.

*Example*

A peat mass having a dryness of 40% is continuously introduced into a pressure vessel in which the temperature is about 180° C. and the total pressure about 20 atm. gage pressure. The pressure vessel is provided with an effectively working agitator of any suitable kind. Steam and gases are exhausted under pressure to a steam generator in which a heat exchange is carried out to give saturated steam of 2 atm. gage pressure. Simultaneously oxygen gas of a purity of 95% for example is introduced into the pressure vessel to maintain pressure and temperature constant by partial oxidation of organic material. The residue partially evaporated after the oxidation is withdrawn from the vessel and allowed to expand, causing the escape of a certain amount of water in form of steam. To complete the drying of the remaining residue this residue admixed with air is blown through a tube drying apparatus by means of a fan, the tubes being externally heated by condensing steam from the steam generator.

The non-condensable gases leaving the steam generator are freed from carbonic acid by pressure washing with cold water and returned to the pressure vessel.

Above is suggested a use of concentrated oxygen gas of 90–100% purity, but in case such conditions are chosen that a sufficient partial pressure of the gas is obtained also gases of a lower content of oxygen may be utilized.

Having thus described my invention I declare that what I claim is:

1. The method of drying peat having a dryness of 25–75% which comprises introducing the peat to be dried and having a dryness of 25–75% into a vessel, introducing oxygen-containing gases into said wet peat to substantially completely oxidize a small portion of the wet peat to water vapor and carbon dioxide with the liberation of heat providing a temperature of between about 150 and about 300° C. and a pressure between about 10 and about 200 atmospheres, exhausting the hot steam and vapors generated in said vessel as the result of said oxidation, removing from the vessel the resulting partially dried peat residue, and utilizing the heat of said steam and vapors to dry said peat residue in a subsequent step.

2. The method of claim 1 wherein said oxygen-containing gases contain 90–100% oxygen.

3. The method of drying peat having a dryness of 25–75% which comprises introducing the peat to be dried and having a dryness of 25–75% into a vessel, introducing oxygen-containing gases into said wet peat to oxidize a small portion of the wet peat to water vapor and carbon dioxide with the liberation of heat providing a temperature of between about 160 and about 200° C. and a pressure of between about 10 and about 30 atmospheres, exhausting the hot steam and vapor generated in said vessel as the result of said oxidation, removing from the vessel the resulting partially dried peat residue, and utilizing the heat of said steam and vapors to dry said peat residue in a subsequent step.

4. The method of claim 3 wherein said oxygen-containing gases contain 90–100% oxygen.

5. The method of drying peat having a dryness of 25–75% which comprises introducing the peat to be dried and having a dryness of 25–75% into a vessel, introducing oxygen-containing gas containing 90–100% oxygen under super-atmospheric pressure into said wet peat to substantially completely oxidize a small portion of the wet peat to water vapor and carbon dioxide with the liberation of heat, exhausting the hot steam and vapors generated in said vessel as the result of said oxidation, removing from the vessel the resulting partially dried peat residue, and utilizing the heat of said steam and vapors to dry said peat residue in a subsequent step.

References Cited in the file of this patent

UNITED STATES PATENTS

| 58,926 | Weissenborn | Oct. 16, 1866 |
| 99,733 | Walker | Feb. 8, 1870 |
| 985,462 | Shepard et al. | Feb. 28, 1911 |
| 1,530,439 | Testrup et al. | Mar. 17, 1925 |
| 1,697,268 | Evesmith | Jan. 1, 1929 |
| 2,057,681 | Harrington | Oct. 20, 1936 |
| 2,137,347 | Olsson | Nov. 22, 1938 |

FOREIGN PATENTS

| 373,971 | Great Britain | Nov. 25, 1930 |
| 721,000 | Germany | May 21, 1942 |